US011656325B2

(12) United States Patent
Arbabian et al.

(10) Patent No.: US 11,656,325 B2
(45) Date of Patent: May 23, 2023

(54) METHODS AND APPARATUS TO REALIZE SCALABLE ANTENNA ARRAYS WITH LARGE APERTURE

(71) Applicant: The Board of Trustees of the Leland Stanford Junior University, Stanford, CA (US)

(72) Inventors: Mohammad Amin Arbabian, Stanford, CA (US); Babak Mamandipoor, San Jose, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 222 days.

(21) Appl. No.: 16/955,757

(22) PCT Filed: Dec. 19, 2018

(86) PCT No.: PCT/US2018/066598
§ 371 (c)(1),
(2) Date: Jun. 18, 2020

(87) PCT Pub. No.: WO2019/126386
PCT Pub. Date: Jun. 27, 2019

(65) Prior Publication Data
US 2021/0011121 A1    Jan. 14, 2021

Related U.S. Application Data

(60) Provisional application No. 62/607,660, filed on Dec. 19, 2017.

(51) Int. Cl.
*G01S 7/40* (2006.01)
*G01S 7/41* (2006.01)
*G01S 13/00* (2006.01)

(52) U.S. Cl.
CPC .............. *G01S 7/40* (2013.01); *G01S 7/411* (2013.01); *G01S 13/003* (2013.01); *G01S 7/4091* (2021.05)

(58) Field of Classification Search
CPC ...... G01S 13/003; G01S 13/42; G01S 13/582; G01S 13/584; G01S 13/878; G01S 7/003;
(Continued)

(56) References Cited

U.S. PATENT DOCUMENTS 9,182,485 B1    11/2015    Andrews et al.
2006/0220951 A1    10/2006    Thome et al.
2015/0276917 A1*    10/2015    Dawber ............... G01S 13/003
342/25 A

FOREIGN PATENT DOCUMENTS

WO    WO-2005010556 A1    2/2005

OTHER PUBLICATIONS

Kong, S. et al. (Jan. 1, 2014). "Wireless Cooperative Synchronization of Coherent UWB MIMO Radar," IEEE Transactions on Microwave Theory and Techniques 62(1):154-165.

* cited by examiner

*Primary Examiner* — Timothy X Pham
(74) *Attorney, Agent, or Firm* — Mintz Levin Cohn Ferris Glovsky and Popeo, P.C.

(57) ABSTRACT

Methods and apparatus, including computer program products, are provided for synchronization. In some example embodiments, there may be provided a method. The method may receiving, at a processor, cross module information, the cross module information including target profile information obtained from radar returns received at first radar module and transmitted by a second radar module; and determining, at the processor, a frequency correction, a time correction, and/or a phase correction, the determining based
(Continued)

at least on the received cross module information. Related systems, methods, and articles of manufacture are also described.

19 Claims, 14 Drawing Sheets

(58) Field of Classification Search
CPC ........ G01S 7/40; G01S 7/4008; G01S 7/4021; G01S 7/4091; G01S 7/411; G01S 7/415
See application file for complete search history.

METHODS AND APPARATUS TO REALIZE SCALABLE ANTENNA ARRAYS WITH LARGE APERTURE

RELATED APPLICATION

This application is a national phase entry of Patent Cooperation Treaty Application No. PCT/US2018/066598 filed Dec. 19, 2018, entitled "METHOD AND APPARATUS TO REALIZE SCALABLE ANTENNA ARRAYS WITH LARGE APERTURE," which claims priority to U.S. Provisional Patent Application No. 62/607,660 filed on Dec. 19, 2017 and entitled "METHOD AND APPARATUS TO REALIZE SCALABLE ANTENNA ARRAYS WITH LARGE APERTURE," the disclosures of which are incorporated herein by reference in their entirety.

FIELD

The subject matter described herein relates to radars.

BACKGROUND

A radar system may include transmitter circuitry for transmitting radio frequency signals via one or more antennas. When an object is encountered, the transmitted radio signals may be reflected or scattered back towards the radar system. These reflected or scattered back radio signals may be considered return radio frequency signals which can be received by one or more antennas and the corresponding receiver circuitry at the radar system. The returns may be processed to determine the location to the object as well as other information about the object. In this way, the radar system can detect objects, locate objects, track objects in a scene, and/or create an image of the scene.

SUMMARY

In some example embodiments, there may be provided a method. The method may receiving, at a processor, cross module information, the cross module information including target profile information obtained from radar returns received at first radar module and transmitted by a second radar module; and determining, at the processor, a frequency correction, a time correction, and/or a phase correction, the determining based at least on the received cross module information.

In some variations, one or more of the features disclosed herein including the following features can optionally be included in any feasible combination The determined frequency correction, the determined time correction, and/or the determined phase correction may be applied to correct errors caused in part by the first radar module and/or the second radar module. The received information may include scene information, wherein the scene information includes map data regarding a location of at least one possible target in view of the first radar module and/or the second radar module. The received information may include in-module measurement information, wherein in-module measurement information includes radar returns received at first radar module and transmitted by a first radar module, the in-module measurements including a corresponding target profile for the at least one possible target. The determining may be further based on the scene information and/or the in-module measurement information. The determining of the frequency correction and/or the time correction may be based on a difference in frequency and/or time determined from at least the target profile information, the in-module measurement information, and/or the scene information. The determining of the phase correction may be based on phase variation obtained from at least the target profile information, the in-module measurement information, and/or the scene information. The phase variation may be obtained by a phase of a selected target in a scene estimated over a plurality of delay profiles. The phase correction may correspond to variations of relative phases of a first local oscillator at the first radar module and a second local oscillator at the second radar module. A target may be selected to enable the determining of the frequency correction, the time correction, and/or the phase correction. The determination of the frequency correction, the time correction, and/or the phase correction may be based on a frequency error, a time error, and/or a phase error determined based on the selected target. The applying may include providing a feedback signal to the first radar module and/or the second radar module to correct for the determined frequency correction, the determined time correction, and/or the determined phase correction. The applying may include adjusting, by the processor, digital data representative of received returns to correct for the determined frequency correction, the determined time correction, and/or the determined phase correction. The first radar module and the second radar module may each comprise clock circuitry, a local oscillator, and at least one antenna. The first radar module and the second radar module may each transmit and receive within at least a portion of the millimeter frequency range of 18 GHz to 300 GHz. The corresponding clock circuitry and/or the corresponding local oscillator at each of the first radar module and the second radar module may be independent without sharing a common reference signal. The corresponding clock circuitry and/or the corresponding local oscillator at each of the first radar module and the second radar module may be partially synchronized in frequency or time, and wherein the applying further synchronizes in frequency, time, and phase. The the at least one antenna may comprise a one dimensional antenna array and/or a two dimensional antenna array. The determining may include determining at least one other type of error, and wherein the applying includes applying a correction for the at least one type of error.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
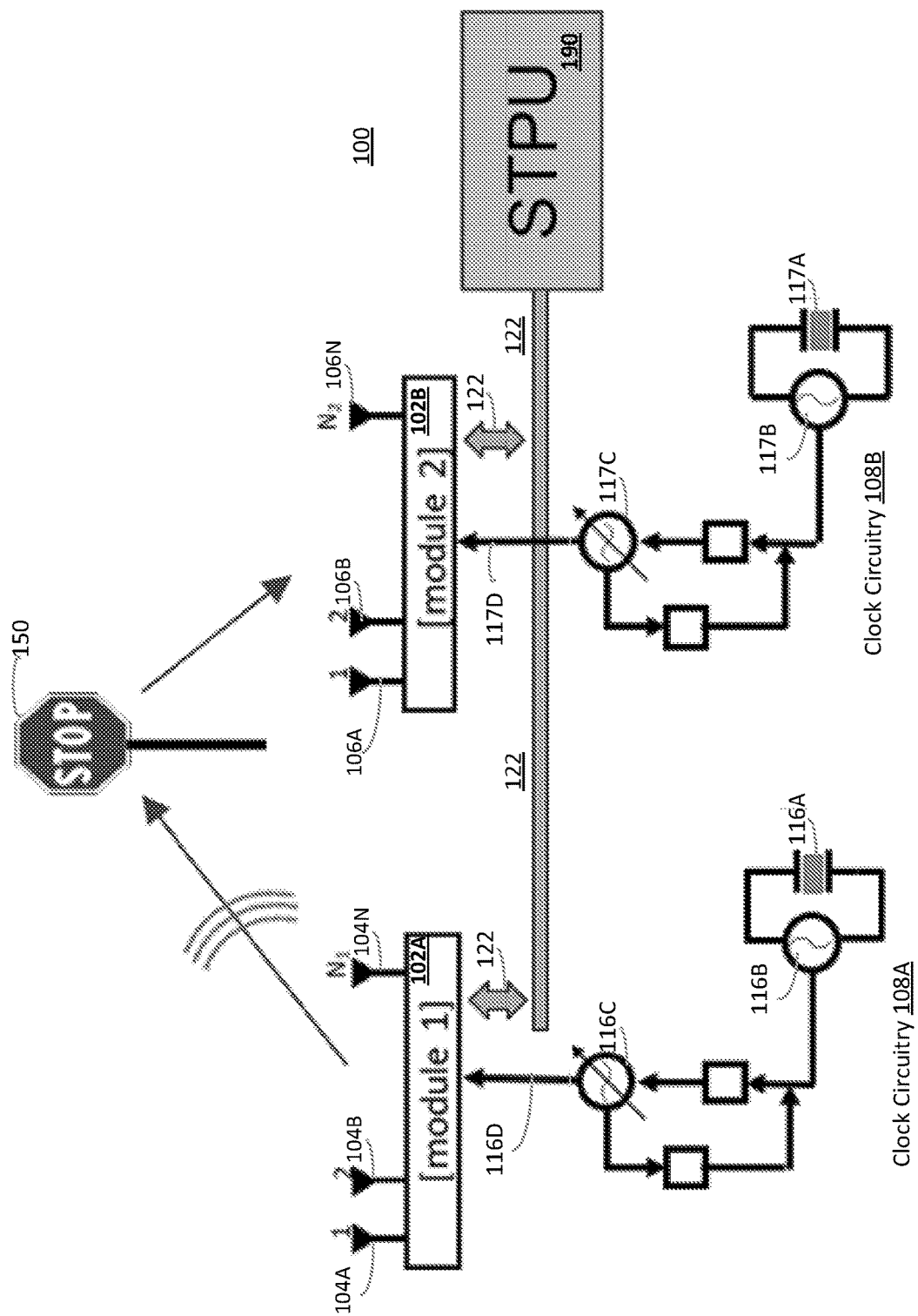
FIG. 1A depicts an example of a system including radar modules and a short time processing unit, in accordance with some embodiments.

Like labels are used to refer to same or similar items in the drawings.

DETAILED DESCRIPTION

FIG. 1A depicts a system 100 including a plurality of radar modules 102A-B. Each of the radar modules may include one or more antennas, such as antennas 104A-N and 106A-N. The radar module 102A may include transmission circuitry and/or receiver circuitry to enable transmission and then reception of radio frequency signals such as radar returns (e.g., reception of returns from the transmission from radar module 102A and/or or reception of the transmission from the radar module 102B). Radar module 102A may include baseband circuitry (e.g., downconverters, mixers, amplifiers, analog-to-digital converters, and/or the like) and/ or other circuitry as well. Radar module 102A may also include clock circuitry 108A, which may be used to provide a reference signal 116D, such as a clock signal or local oscillator signal. Radar module 102B may be configured in the same or similar manner as radar module 102A.

The clock circuitry 108A may include a frequency reference 116A coupled to (and used to lock) an oscillator 116B, which is further coupled to a variable (or adjustable) local oscillator 116C, which can be adjusted in frequency, time, and/or phase. The local oscillator 116C may provide an output signal 116D that serves as a reference signal. This reference signal 116D may be used locally at the radar module 102A for synchronization in frequency, time, and/or phase. For example, the reference signal 116D may provide a local oscillator signal used for processing the received returns. To illustrate further, the reference signal 116D may serve as a local oscillator signal which is provided as an input to a mixer for down converting the received return signals to an intermediate frequency (or baseband frequency) and/or for up converting from baseband/intermediate frequency to RF for transmission.

The clock circuitry 108B may also include a frequency reference 117A coupled to an oscillator 117B, which is further coupled to a variable (or adjustable) local oscillator 117C, which can be adjusted in frequency, time, and/or phase. The local oscillator 117C may provide an output signal 117D that serves as a reference signal used locally at the radar module 102B for synchronization in frequency, time, and/or phase.

In operation, the radar module 102A may transmit one or more radio frequency (RF) signals (which may also be referred to as "radar signals") via one or more antennas 104A-N and then receive one or more RF signals such as returns received via one or more antennas 104A-N. The return (also referred to as return signal) may be correlated against a transmitted signal to estimate a round-trip delay. And, the return's estimated frequency offset with respect to the transmitter's local oscillator may provide an estimate of the Doppler shift due to the target's motion. In the case of multiple receive antennas, the angle of arrival of the return waveform may be estimated. The angle of arrival estimate may also be improved using MIMO radar technology. In the case of MIMO, N transmit elements may send orthogonal, or quasi-orthogonal waveforms, or take turns transmitting. If there are M receive elements, M received signals may be obtained for each transmitted signal. Collecting the signals corresponding to the N transmit elements, N×M received signals are obtained, which emulates the effect of an N×M-dimensional virtual receive array to provide improved angular resolution. The MIMO radar technology may also use the synchronization of frequency, timing, and/or phase (as disclosed herein) across transmit and receive elements within each radar module.

From the received returns, the radar module 102A may determine information for the target 150. This information about a given target is referred to herein as a target profile or target profile information. The target profile may include range (e.g., distance from radar module 102A to the target 150), Doppler (which may indicate any relative motion of the target 150 or RF module 102A), and/or angle of arrival to the target 150. The radar module may determine additional profile information about the target in the scene as well. Examples of the additional profile information include micro-Doppler (e.g., small Doppler signals that are generated due to motion of smaller parts of a large target, such as human hands and legs), radar cross section (RCS) of the target, other geometrical or electromagnetic properties of target (e.g., shape, size, elevation, orientation, reflectivity), and/or the like.

The radar module 102B may transmit one or more RF signals via one or more antennas 106A-N and then receive its own return RF signals via the one or more antennas 106A-N. From radar module 102B's own received returns, the radar module 102B may also determine (e.g., measure, calculate, estimate, etc.) additional profile information for the target 150. This profile information may include range (e.g., distance from radar module 102B to the target 150), Doppler (which may indicate any motion of the target 150 or RF module 102B), angle of arrival to the target 150, and/or additional profile information.

To have the radar modules 102A-B work in a cooperative manner so that the antenna arrays of each of the radar modules 102A-B can cooperatively scan the same scene of targets as a single, larger antenna array, the radar modules 102A-B need to be coherent, such that the radar modules are synchronized with respect to frequency, time, and/or phase. An approach to this problem is to have a common, clock source or reference signal coupled directly to each of the radar modules 102A-B. This common, clock or reference signal shared between the two modules 102A-B synchronizes the radar modules 102A-B with respect to frequency, time, and/or phase. Although this approach can be used in some instances, it may not be practical in certain environments where common clocks cannot be shared. For example, the modules 102A-B may be at different locations, which may make the sharing of the common, clock or reference signal impractical. Moreover, the advent of higher frequency radars (e.g., millimeter wave radars in the 30-300 GHz spectrum) may make synchronization using common clock techniques (e.g., a GPS clock reference, through a common clock distributed to all of the radar modules, etc.) more of a challenge as local clock drift and other errors can introduce sufficient error in phase to result in degradation, or even loss, of synchronization.

In some embodiments, there is provided processor based technology to synchronize separate radar modules, such as radar modules 102A-B.

In some embodiments, the processor based technology may reduce or eliminate the need for a common reference signal being directly coupled to the radar modules to synchronize the separate radar modules. In some embodiments that utilize a common clock (e.g., GPS, a common clock distributed to all the modules, etc.) the processor based technology may further enhance the synchronization by reducing phase errors between the radar modules, which may provide meaningful gains in the case of for example millimeter wave radars where GPS alone may not provide sufficient synchronization among the radar modules.

In some embodiments, the processor based technology may, based on certain target objects such as target 150 (which is also referred to herein as a calibration target), correct for frequency, time, and/or phase errors between the radar modules 102A-B to enable synchronization in frequency, time, and/or phase among the radar modules 102A-B. For example, the processor based technology (hereinafter referred to as "short time processing unit" or STPU for short) may estimate time differences, frequency differences, and/or phase differences between the radar modules, such as between radar modules 102A-B.

To illustrate by way of an example, the radar module 102B may transmit and receive its own returns. From the returns, the STPU 190 may determine a target profile which includes range, Doppler, angle of arrival associated with the target 150, and/or additional information about the target. When the STPU processes returns from the other radar module 102A for the same target 150, the STPU may determine that there is a frequency difference at a given time $t_0$, for example. As both radar modules 102A-B are looking at the same target 150, this frequency difference may be attributed to the differences in the local clocks or reference signals, such the difference in frequency between the reference signal 116D and 117D.

The reference signal 116D may be used to generate at radar module 102A a local oscillator signal used for down conversion and/or up conversion, while the reference signal 117D may be used to generate at radar module 102B a local oscillator signal used for down version and/or up conversion. If there are any differences in frequency, time, or phase between these two reference signals 116D and 117D, the radar modules 102A-B may not be synchronized so they cannot operate as a larger, array of antennas. These differences in the reference signals may be considered errors, such as frequency, time, and phase errors that can be corrected in accordance with some example embodiments to provide synchronization between the radar modules 102A-B.

To synchronize the two radar modules 102A-B and their corresponding antenna arrays, the STPU 190 may correct the returns received at radar module 102B by adding (or subtracting) each of the received returns by the determined time difference, the determined frequency difference, and/or the determined phase difference. For example, the STPU may process the received returns by adjusting the frequency, time, and/or phase of the returns or features extracted from the returns. Alternatively or additionally, the STPU 190 may provide to the clock circuitry 108A and/or 108B one or more feedback signals to correct for timing, frequency, and/or phase, so that the radar modules 102A-B are in synchronization with respect to frequency and phase.

In some embodiments, the STPU 190 may provide a processor based technology to provide frequency synchronization, time synchronization, and/or phase synchronization among separate radar modules, without requiring a shared or directly coupled common clock source for synchronization among the radar modules.

Figure 1B:
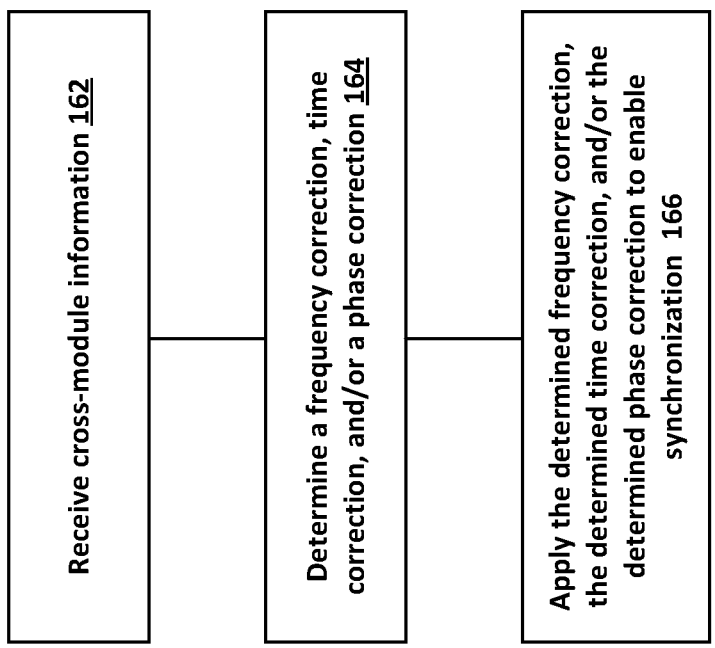
FIG. 1B depicts an example of a process for synchronization, in accordance with some embodiments.

FIG. 1B depicts an example of a process for synchronizing radar modules to enable formation of a larger antenna array, in accordance with some embodiments.

At 162, the STPU 190 may receive cross module information. For example, the STPU 190 may receive profile information associated with a given target, such as target 150. This received profile information may include cross module information for a given target.

For a given target such as target 150 for example, the cross module information may include returns received by radar module 102B due to transmissions from radar module 102A. In this context, the cross module information represents receiving returns associated with another radar module's transmissions. Moreover, the cross module information may include the range, Doppler, angle of arrival data, and/or additional information associated with a given target, such as the target 150. For radar module 102B for example, the cross module information may include a digital representation (e.g after analog to digital conversion) of the return signals (caused by the transmission by radar module 102A) and/or other information determined (e.g., measured, calculated, etc.) from the returns. Examples of this other information include target profile information such as the range, Doppler, phase, delay, angle of arrival data obtained from the returns resulting from radar module 102A's transmission and received by radar module 102B.

At 164, the STPU 190 may determine, based at least on the cross module information, a frequency correction, a time correction, and/or a phase correction. For example, the STPU may determine a frequency difference based on the cross module information associated with a given target, such as target 150. This frequency difference may be used as a frequency correction to enable synchronization. Alternatively or additionally, the STPU may determine a time difference based on the cross module information associated with a given target, such as target 150. The time difference maybe in terms of a clock drift in the envelope of a waveform or the start time of the waveform. This time difference may be used as a time correction to enable synchronization. Alternatively or additionally, the STPU may determine a phase difference based on the cross module information associated with a given target, such as target 150. The phase difference may be in terms of a relative phase of a local oscillator or a relative clock drift. This phase difference may be used as a phase correction to enable synchronization.

At 166, the determined correction(s) may be applied. For example, the STPU 190 may provide feedback to at least one of the radar modules 102A-B. The feedback may be provided via link 122 to for example radar module 102A or radar module 102B. The feedback may indicate the determined frequency correction, such as a frequency difference determined at 164, time correction, such as a time difference determined at 164, and/or the determined phase correction such as the phase difference determined at 164. In this way, the radar module 102A can adjust its reference signal 116D (or other component in the clock circuitry 108A) in frequency, time, and/or phase to synchronize with the other radar module's 102B's reference signal 117D. Alternatively or additionally, the determined correction(s) may be applied to the received signal or the corresponding data. For example, the STPU 190 may correct the each of the returns (or, e.g., the corresponding digital data for the return) received at radar module 102B by adjusting the returns (or, e.g., the corresponding digital data for the return) by adding (or subtracting) the determined frequency correction, time correction, and/or phase correction. As a post-processing technique and without feedback link 122 for example, the STPU may process the data for the returns by adjusting phase, frequency, and/or time until there is synchronization in the data associated with a pre-determined calibration target. In some embodiments, the STPU may only determine the frequency correction, time correction, and/or phase correction, and record these corrections corresponding to the received returns for possible later stage processing.

In some embodiments, the process of FIG. 1B may be performed in a dynamic manner in the sense that the frequency, time, and/or phase errors may be determined and applied repeatedly to correct the errors as they occur over time.

Figure 1C:
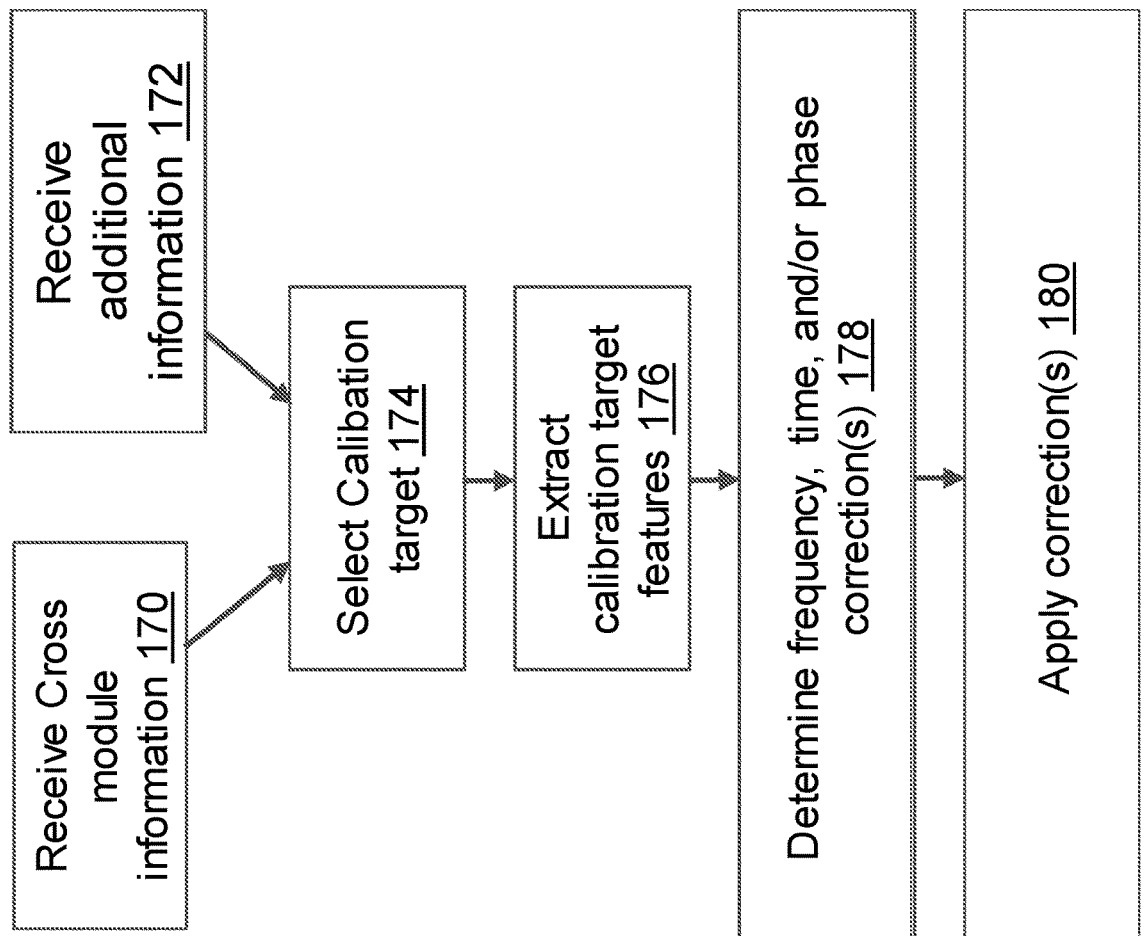
FIG. 1C depicts another example of a process for synchronization, in accordance with some embodiments.

FIG. 1C depicts another example of a process for synchronizing radar modules to enable formation of a larger antenna array, in accordance with some embodiments.

At 170, the STPU 190 may receive cross module information. The cross module information may be in the same form as noted above with respect to 162. Referring to radar module 102B, the radar module 102B may receive returns caused by transmissions from radar module 102A. These received returns may be processed to baseband, analog-to-digital converted, and further processed and measured to determine profile information including the cross module information, such as the range, Doppler, angle of arrival data, time delay between pulses returned from the target 150, and/or additional information.

At 172, the STPU 190 may receive additional information. This additional information may include scene information and/or measurements made locally (referred to as in-module measurement measurements). Referring to radar module 102B, the radar module 102B may receive its own returns. From its own returns, the radar module 102B may process to baseband, analog-to-digital convert, and determine for a given target the in-module measurement information, such as the range, Doppler, angle of arrival data, time delay between pulses returned from the target 150, and/or additional information.

For radar module 102B for example, the in-module measurement information may include a digital representation of the return signals caused by radar module 102B's own transmissions and/or other information determined (e.g., measured, calculated, etc.) from the returns. Examples of this other information include target profile information such as the range, Doppler, phase, delay, angle of arrival data obtained from the returns resulting from radar module 102B's transmission and received by radar module 102B. The scene information may include map data or other information about the scene, such as the geo-location (e.g., latitude, longitude, and altitude) of a target such as target 150, the velocity of the target, etc. The scene information may thus indicate, based on the location of the radar modules, possible targets that may be used for synchronizing the radar modules. Based on the geo-location of radar modules 102A-B at any given instant in time, the STPU may obtain from a database the geolocation of one or more possible targets, such as target 150. Moreover, the possible targets may be ranked or scored based on the size of target, radar cross section of the object, whether the target was previously used for calibration, and/or the like. The scene information may also include velocity (e.g., whether the target is static, whether it is moving, speed and/or direction of target movement, acceleration rate of the target, and/or the like) for the radar modules 102A-B and/or the possible calibration targets in a scene.

For a given scene including one or more targets, the STPU 190 may, at 174, select at least one target as a calibration target, which can be used to determine (e.g., measure, calculate, etc.) a frequency difference, timing difference, and/or a phase difference. For example, the STPU 190 may receive returns of a scene collected from one or more radar modules and select from the return data a target, such as target 150. Alternatively or additionally, the selection of a target may be based on the information received at 172, such as the scene information (e.g., map data). Alternatively or additionally, the target may be selected based on a variety of factors, such as whether the target is stationary, the size (or radar cross section) of the target, whether the target had previously been used successfully as a calibration target, whether the target can be seen by the radar modules, and/or the like.

At 174, the STPU 190 may also take into account the additional information to select at least one target as a calibration target. For example, map data may indicate that a building or a sign may serve as a calibration target. This map data (alone or in combination with the return data) may enable the STPU to select the building or the sign as a calibration target.

At 176, the STPU 190 may extract one or more features for the selected target. From the returns (or the digital data representative of the returns) from each of the targets, the extracted features may include target profile information such as range to the target, Doppler associated with the target, angle of arrival with respect to the radar returns, velocity of the target, direction of motion of the target, type of target (e.g., based on the microDoppler seen at the different radar modules), extent (e.g., the number of range-Doppler bins occupied by the target), height of the object, reflection properties (e.g., scattering or specular reflection of the object), and/or the like. In some example embodiments, the features are extracted from cross module information, such as from the cross module returns caused by transmission from radar module 102A but received at radar module 102B. Alternatively or additionally, the features may be extracted from so-called in-module measurements, such as the returns caused by transmission from radar module 102A and received at radar module 102A.

At 178, the STPU 190 may determine, based on the selected target and the corresponding extracted features, a frequency correction, time correction, and/or a phase correction. For a given selected target such as target 150, the STPU 190 may determine from the extracted features for the selected target 150, a frequency difference, a time difference, and/or phase difference. To illustrate further, the cross module information corresponding to the selected target 150 enables the STPU to determine frequency, time, and/or phase differences between the reference signals at radar module 102A and radar module 102B. The frequency difference may be used as a frequency correction to enable a correction of the frequency of the reference signal 116D or 117D. And, the time difference may be used as a time correction (e.g., a true time correction by shifting in time) to enable a correction of the time delay of the reference signal 116D or 117D. Moreover, the phase difference may be used as a phase correction to enable a correction of the phase of the reference signal 116D or 117D.

At 180, the correction(s) determined at 178 may be applied. The application of the correction(s) may be performed in the same or similar manner as noted above at 166.

After the radar modules are synchronized, the radar modules may be used cooperatively in a coherent manner by dynamically updating for frequency, time, and/or phase over time to correct for the errors as they occur. For example, radar modules 102A-B may be in different locations and scan a scene from different perspectives to collect returns on a variety of additional target objects. Because the radar modules are synchronized, the antenna arrays 104A-N and 106A-N may comprise an aggregate antenna array of elements 104A-N and 106A-N. In some embodiments, the STPU may determine the errors in frequency, time, and phase and not provide feedback to the radar modules, but instead use the determined errors for post processing correction of the returns.

Although the example of FIG. 1A depicts only two radar modules, the system may include other quantities of radar modules. Moreover, although the example of FIG. 1A depicts only a single calibration target 150, a plurality of calibration targets may be used. Likewise, a scene may include a plurality of targets some of which may be stationary and some of which may be in a mobile state. Although FIG. 1A depicts a one dimensional array of antennas, other quantity of antennas may be implemented including a single antenna and/or other configurations (e.g., two dimensional antenna arrays). At least one of the antennas may be directional, omni-directional, and/or have other patterns. And, at least one of the antennas may comprise a high-gain directive antennas, while at least one of the antennas may comprise a dielectric lens type antenna.

Furthermore, the STPU 190 may be implemented as a centralized processor so that a plurality of radar modules may provide return data to the STPU as shown at FIG. 1A. However, the STPU may be implemented as distributed devices, so that each radar module includes STPU functionality. Alternatively or additionally, the STPU may be implemented as a service, such as a cloud service accessible at a server on the Internet. Alternatively or additionally, the STPU may be implemented as virtual function (or machine) accessible as a cloud service or web service. When this is the case, the STPU may be instantiated in order to service a given set of radar modules. In some implementations, the STPU may include at least one processor and at least one memory configured to provide the operations disclosed herein with respect to the STPU. The STPU and/or any associated baseband processing performed on the returns may be performed by digital signal processor circuitry, a field-programmable gate array (FPGA), a graphics processing unit (GPU), and/or other types of processors or accelerators.

In some example embodiments, the STPU provides a virtual synchronizer by providing a feedback to radar modules 102A-B to correct certain errors (e.g., frequency, time, and/or phase) or by providing a post-processing adjustment to the returns and, in particular, the data corresponding to the returns to correct the returns for certain errors in frequency, time, and/or phase. In some example embodiments, the correction of these errors may be dynamic in the sense that the correction may be performed repeatedly as frequency, time, and/or phase errors change over time. For example, each frame representing a period of time (e.g., a can of a scene) may be processed to correct for phase errors, as well as frequency and/or time.

The following description provides an example of how the frequency difference may be determined as noted above at 164 and 178. Referring again to FIG. 1A, suppose in the example of FIG. 1A, a transmitter at radar module 102A transmits a sinusoidal waveform (e.g., a pilot tone) such as $x_1(t)=A_1\cos(\omega_1 t+\varphi_1)$ to illuminate a scene of targets including target 150 (which in this example is static so it is not in motion). The transmitted wave hits the target 150, which in this example is a calibration target selected to enable calibrating the radar modules 102A-B for frequency synchronization. A receiver element in radar module 102B receives a backscattered signal after a time delay of $\tau$, and a change in the amplitude and the phase of the received signal due to the reflection as follows:

$$x_1(t-\tau)=A'\cos(\omega_1(t-\tau)+\varphi_1+\varphi_r) \qquad (1).$$

For the sake of explanation, the radar modules 102A-B and the target 150 are stationary (e.g., not in a mobile state), although the STPU 190 may correct for frequency and phase even when the target 150, radar module 102A, and/or radar module 102B are in a mobile state as well. The receiver at radar module 102B may have its own reference signal, such as frequency reference $\omega_2$ but the frequency reference $\omega_2$ may not yet be synchronized with the reference signal at radar module 102A. The received return at radar module 102B may be processed, for example, by down converting, mixing with a local sinusoidal reference signal (e.g., reference signal 117D), and low-pass filtering. After the mixer, the received signal has the following form:

$$\begin{aligned}x_1(t-\tau)\,{}^*x_2(t)&=A'\cos(\omega_1(t-\tau)+\varphi_1+\varphi_r)\,{}^*A_2\cos(\omega_2 t+\varphi_2)\\&=1/2A'A_2[\cos((\omega_1+\omega_2)t-\omega_1\tau+\varphi_1+\varphi_r+\varphi_2)+\cos\\&\quad((\omega_1-\omega_2)t-\omega_1\tau+\varphi_1+\varphi_r-\varphi_2)]\end{aligned} \qquad (2).$$

And, after the low-pass filter, the received signal has the following form:

$$LPF\{x_1(t-\tau)\,{}^*\,x_2(t)\}=1/2A'A_2\cos(\Delta\omega t+\omega_3) \qquad (3),$$

where $\Delta\omega=\omega_1-\omega_2$ and $\varphi_3=-\omega_1\tau+\varphi_1+\varphi_r-\varphi_2$. Since the target 150 in this example is static, there is no Doppler effect induced by the movement of the target such as target 150 or the radar modules 102A-B, so any sinusoidal fluctuations of the received signal in Equation (3) is due to the frequency mismatch between the reference signals, such as the local oscillators or clocks at the two radar modules 102A-B. In some embodiments, the STPU 190 may estimate this frequency difference, as noted at 164 and 178. In some embodiments, the STPU 190 may compensate for the frequency difference by applying a correction to the received signal (or corresponding data) associated with radar module 102B (which may be part of a digital post processing of the return signal data at the STPU) as noted at 166 and 180. Alternatively or additionally, the STPU 190 may provide a feedback signal to at least one of the radar modules to apply an adjustment to the frequency of the local oscillator to correct for the frequency mismatch, in accordance with some embodiments as noted at 166 and 180.

Figure 2A:
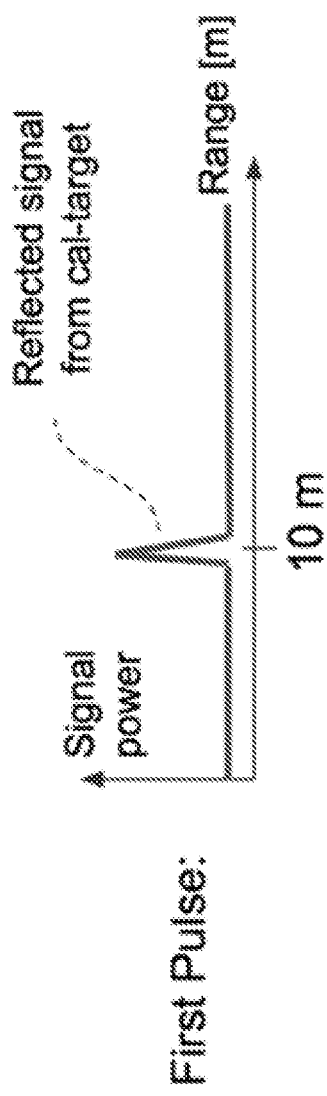
FIG. 2A and FIG. 2B depict radar signals which may be used to determine time delay, in accordance with some embodiments.
Figure 2B:
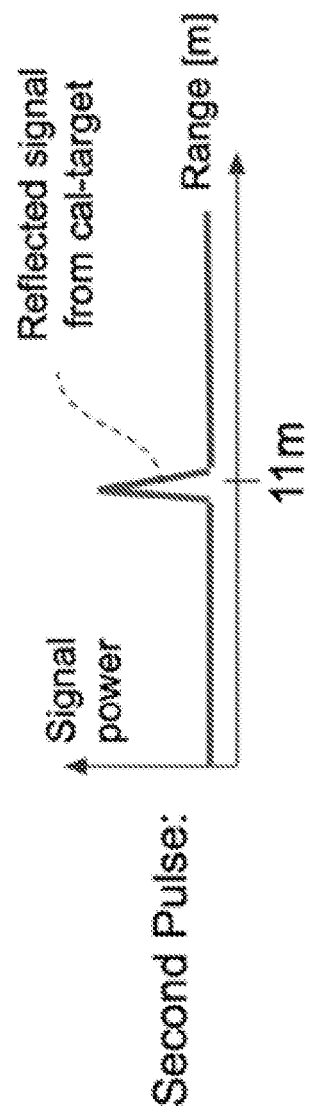

The following description provides an example of how a time difference may be determined as described at 164 and 178. In the example of FIG. 1A, the radar module 102A may transmit a train (or sequence) of waveforms (e.g., short time-domain pulses, chirp waveforms with a frequency ramp, and/or the like) that illuminate the scene, which in this example includes target 150. The signals reflect off the static targets including calibration target 150 in the scene, and these signals are received by radar module 102B. Suppose that at time instance t=0, the two radar modules 102A-B have the same or similar time reference (e.g., through an external triggering signal). After this point, the radar modules 102A-B may rely solely on their free running internal clocks for measuring the time and providing synchronization. This may lead to a clock drift of the relative time references between the two radar modules over time. In this example, the radar module 102B may estimate the range of the targets, such as target 150, in the scene using the time of arrival (τ) of narrow pulses, given by R=cτ/2 where c is the speed of light. For example, given that the static target 150 is at a range R equal to 10 meters from the radar module 102B. The first pulse as shown at FIG. 2B may provide an accurate estimate of the range. Supposing the range of the same target 150 is estimated using the second pulse is at 11 meters. Since the target 150 and the radar modules 102A-B are all stationary, the timing drift in the estimated range from pulse 1 to pulse 2 is due to the timing drift of the clocks (or local oscillators) of the two radar modules 102A-B. This timing (or clock) drift may be given by the following:

$$\Delta t = \frac{2\Delta R}{c} = \frac{2}{c}. \quad (4)$$

In some embodiments, the STPU 190 estimates this timing drift and compensates for the drift in the received radar returns by applying a time correction to the received return data (e.g., as noted above the time correction may be applied as part of a digital post processing of the return signal data at the STPU) or providing a feedback signal to the radar modules 102A-B to enable a local correction of reference signals 116D and/or 117D and/or other components (clocks or local oscillators) for the timing or clock drift.

Figure 3:
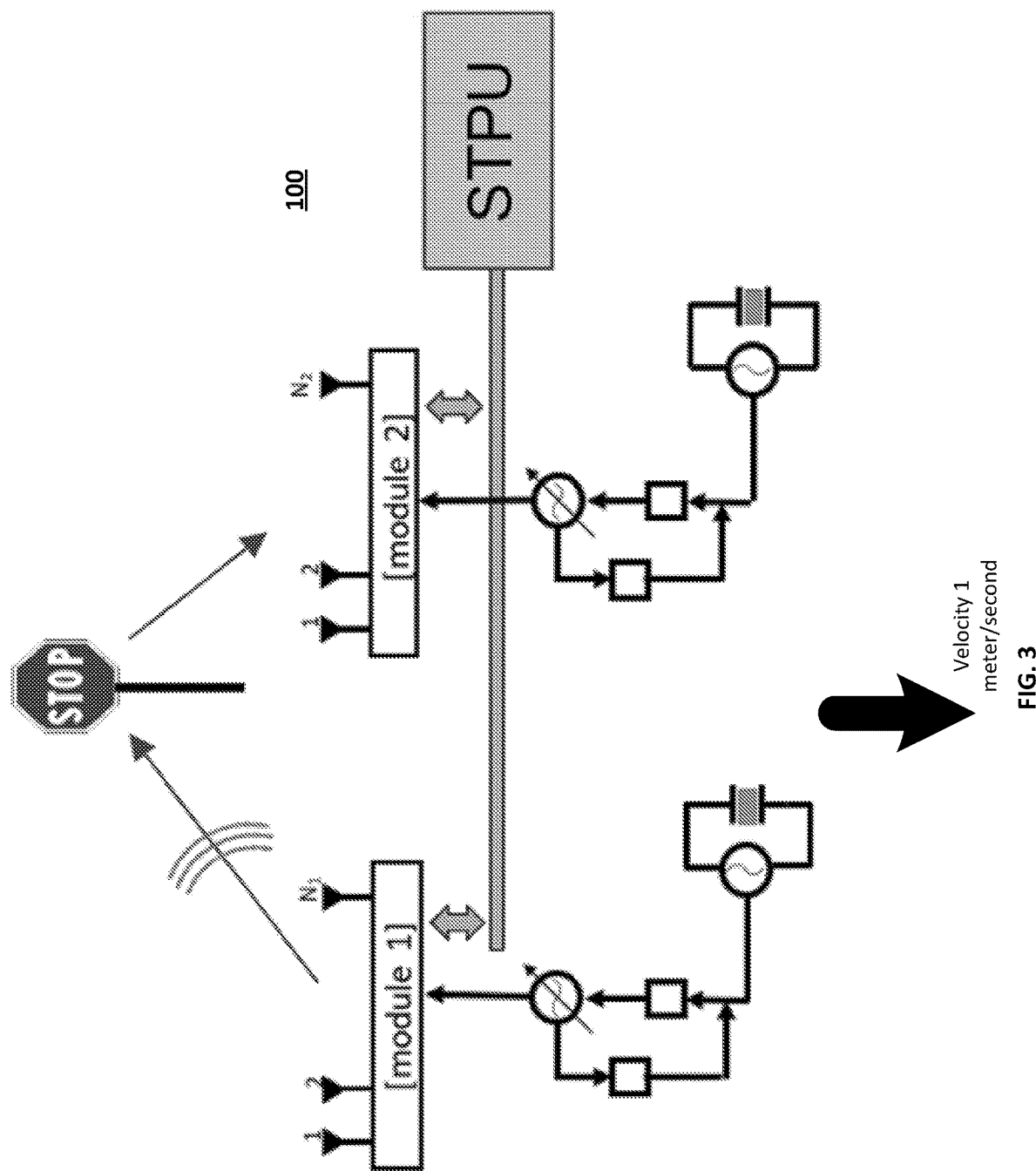
FIG. 3 depicts the system of FIG. 1 with the radar modules in a mobile state, in accordance with some embodiments.

FIG. 3 depicts the system of FIG. 1A but in the example of FIG. 3, the radar modules 102A-B are moving with respect to the scene including target 150. In this example, the radar modules 102A and 102B are in a mobile state (e.g., on a moving platform) that moves away from the static calibration target 150 at a given velocity (e.g., which is known or estimated). Although the example depicts the radar modules being mobile, the target 150 may be mobile while the radar modules 102A-B may be stationary.

Figure 4A:
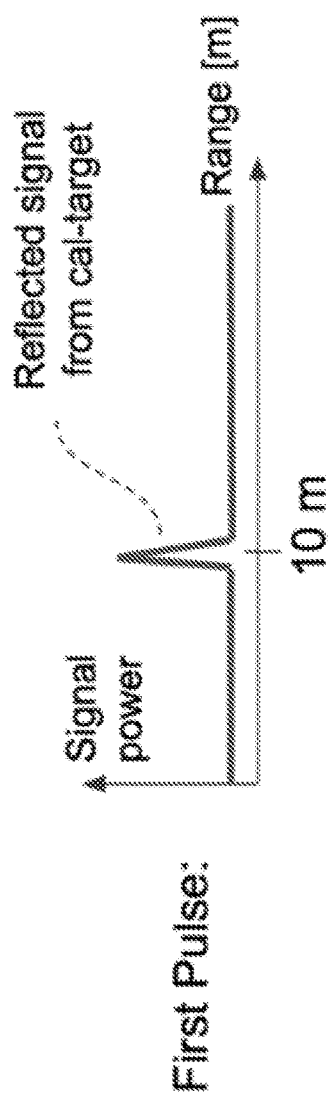
FIG. 4A and FIG. 4B depict pulses which may be used to determine clock drift, in accordance with some embodiments.
Figure 4B:
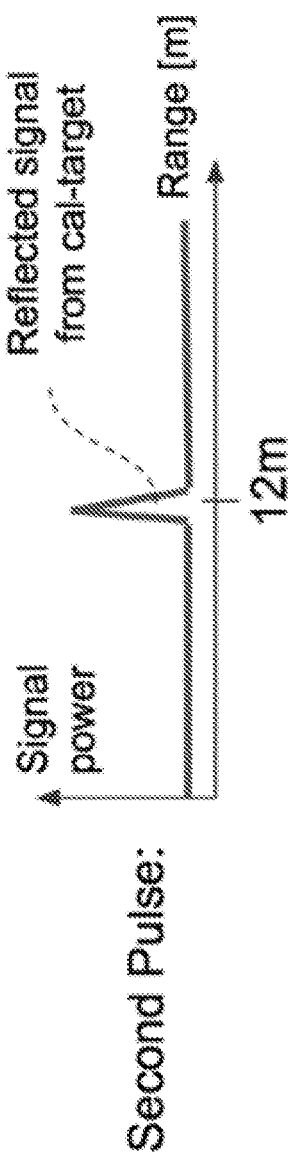

In the FIG. 3 example, the radar modules 102A-B are moving away from the target 150 at a velocity of 1 meter/sec. The narrow pulses are transmitted at the rate of 1 pulse/sec. Therefore, during the time interval between a first pulse 1 and a second pulse 2, the radar modules 102A-B platform has moved away from the calibration target 150 by 1 meter. Supposing the distance of the target 150 from radar module 102B is at 10 meters at t=0, the first pulse would be as shown at FIG. 4A. The distance estimated by the second pulse, however, is estimated at 12 meters. In this example, the STPU 190 receives an accurate estimate of the platform velocity (e.g. using wheel odometer data). As the calibration target 150 is stationary, the location of the target 150 for the second pulse should be at 11 meters away from the radar. The mismatch ΔR between the estimated range using the second pulse (12 meters in this example) and the expected range based on the knowledge of the platform velocity (11 meters in this example) is due to the clock drift between the two radar modules 102A-B. The STPU may compensate for this clock drift. The clock drift may be given by the following:

$$\Delta t = \frac{2\Delta R}{c} = \frac{2}{c}. \quad (5)$$

In some embodiments, timing reference, oscillator frequency, and phase drifts may be estimated using chirp waveforms.

Figure 5:
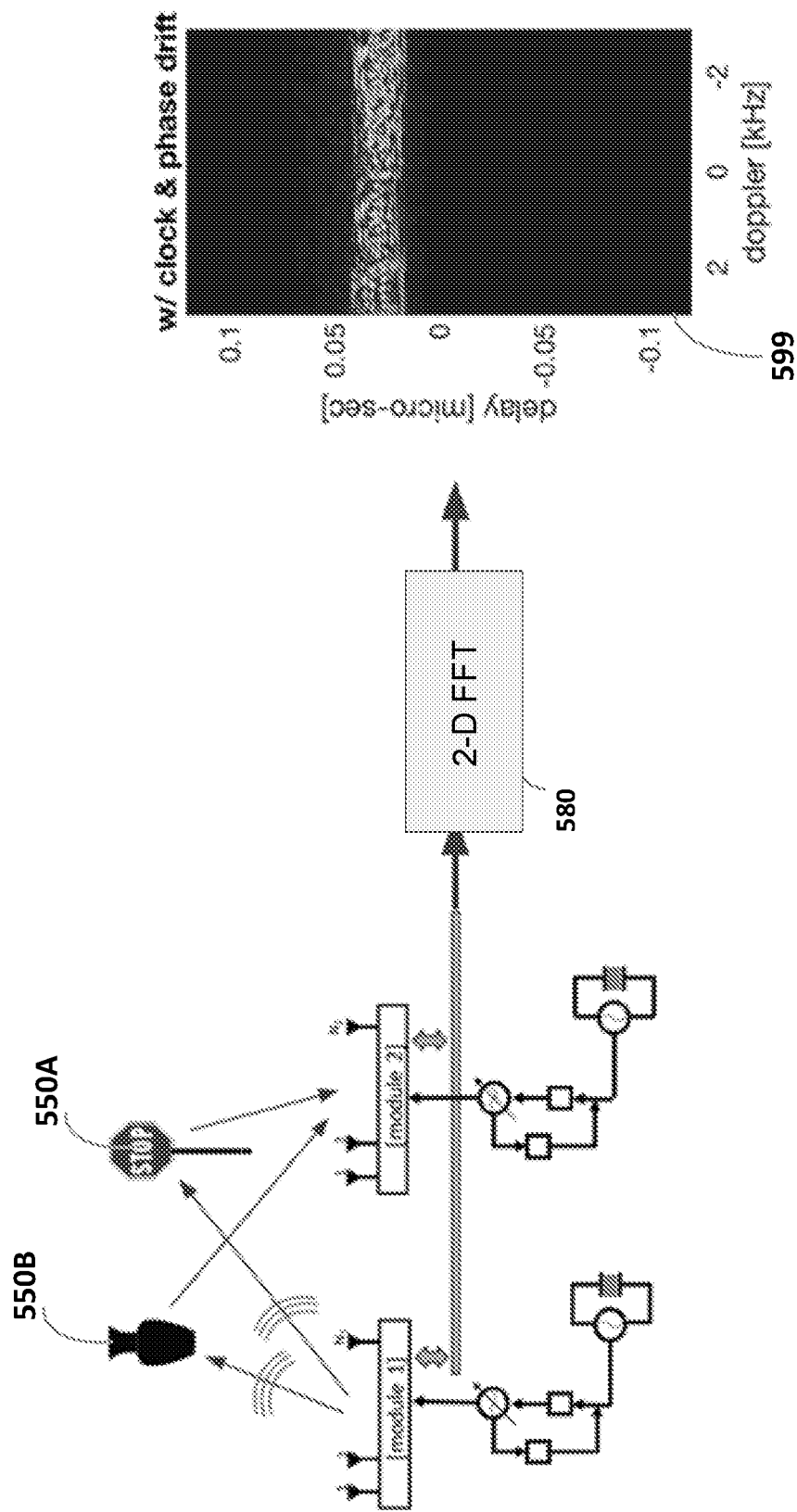
FIG. 5 and FIG. 6 depict additional examples radar systems, in accordance with some example embodiments.

FIG. 5 depicts an example of a system in which chirp waveforms are used to estimate the clock frequency and phase drifts.

Radar modules 102A-B may transmit and receive chirp waveforms. A chirp wave form refers to a signal which sweep up in frequency (up-chirp) or sweeps down in frequency (down-chirp). A transmitter element at radar module 102A transmits a train of chirps, and a receiver element at radar modules 102B receives the returns, such as back-scattered signals resulting from the transmitted train of chirps.

FIG. 5 shows Fast Fourier Transform (FFT) processor 580 (e.g. a two-dimensional FFT processor), which may process returns (caused by the train of chirps) to form the delay-Doppler plot 599 corresponding to the scene including targets, such as targets 550A-B. The targets 550A-B are stationary in this example, so the targets should not generate any Doppler shifts in the received signal. As the radar modules 102A-B are not synchronized in the phase of their carrier signals (e.g., as the modules 102A and 102B may use separate and independent local oscillators), the radar modules may experience somewhat random phase shifts relative to each other.

At FIG. 5, the plot 599 shows the output of the two-dimensional FFT processing 580 for estimating the delays and Dopplers. Generally, the input to the 2D FFT is the received returns from the train of chirps which includes delays and Dopplers induced by the targets in the scene, and the output of the 2D FFT may provide an explicit delay-Doppler domain representation of the received returns. For example, the magnitude of the 2D FFT may be plotted as a delay-Doppler profile as shown at FIG. 5 at 599. And, the phase may be obtained from the output as well (e.g., as the output includes a complex imaginary portion from which the phase can be determined). In other words, the first dimension of the FFT is taken within each chirp, and the output of the FFT provides delay profile information associated with that chirp, for example the delay profile shown in FIG. 7B at 750A. The second dimension of the FFT is taken for each FFT bin of the delay profiles and across multiple chirps, providing thus Doppler values corresponding to that delay bin. The drifts in time and frequency may be relatively slow, when compared to the more dynamic (e.g., fast changing, such as greater than 10 degrees per 100 micro-seconds) phase drifts. The time and frequency may thus be modeled and tracked for correction and compensation of the clocks at the radar modules. However, the phase drifts of local oscillators at the radar module may occur at a much faster rate or time-scale relative to clock and frequency drifts and chirp rate, so the dynamics of the phase drift of oscillators may not be as readily modeled and thus not as readily corrected and compensated. For example, the phase drifts may not be accurately modeled and tracked by standard filtering techniques, such as Kalman filtering, particle filtering, etc.

Figure 6:
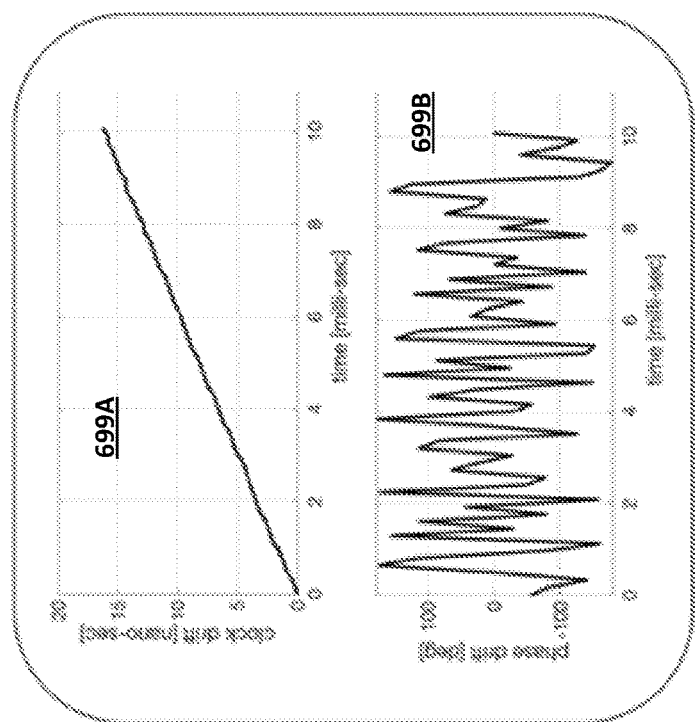
Figure 6:
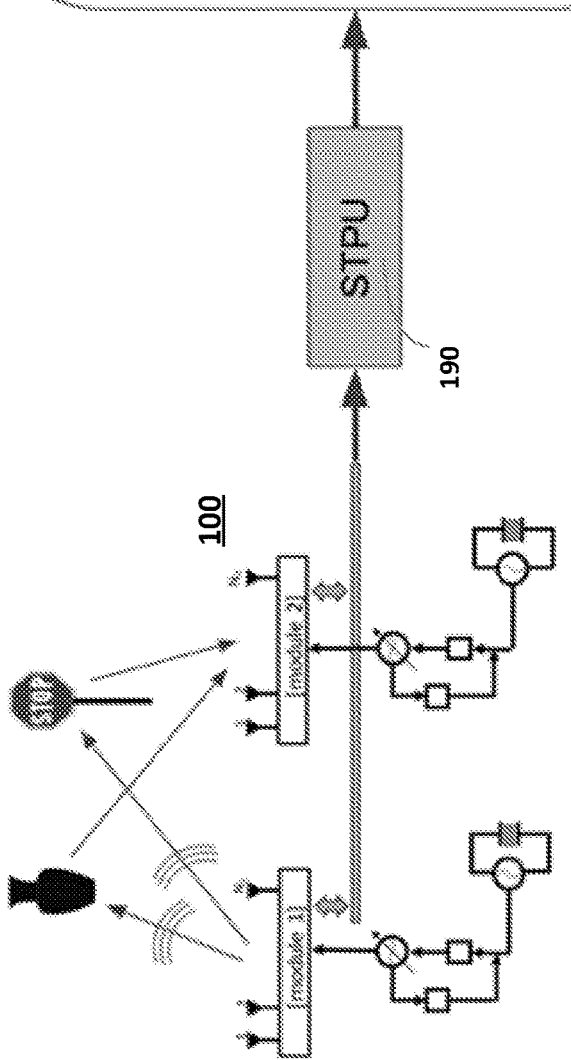

FIG. 6 depicts the system of FIG. 1 but further the plots 699A and 699B. The plot 699A depicts the estimated local clock drift in time (e.g., nanoseconds) over time in milliseconds for a frame of chirps. And, the plot 699B depicts phase drift of the local oscillators (e.g., in degrees) over time (in milliseconds) for a frame of chirps. As noted above, the time drift as shown at plot 699A may vary slowly, when compared to the more dynamic, fast changes associated with phase drift at 699B. Although plot 699A depicts local clock drift, similar "slow varying" results may be obtained for frequency drift of a local oscillator or clock.

In some embodiments, the STPU 190 determines and corrects for slow-varying errors (e.g., clock drift in time and/or frequency), and the STPU determines fast-varying errors associated with phase and corrects for fast-varying errors (e.g., relative phase drift of the local oscillators).

FIG. 7 depicts an example implementation of a two stage process to estimate and correct for a so-called "slow-varying" error such as clock drift in time and then estimate a so-called "fast-varying" such as phase error and correct for that phase drift.

At 705, cross module information may be received by the STPU 190. This may be implemented in the same or similar manner as noted above with respect to 170. At 707, additional information may be received by the STPU. This may be implemented in the same or similar manner as noted above with respect to 172.

At 710, the STPU 190 may determine delay information, such as a delay profile, corresponding to each received chirp. The STPU may receive one or more received chirps transmitted at radar module 102A but received at radar module 102B. As the received chirp(s) traverse the scene on their way to the receiver, the signals are affected by the targets (which for example can be measured as a delay). For a received chirp, the STPU 190 may compute a 1D FFT of the received chirp, which transforms the frequency domain chirp returns into a time domain representation referred to herein as a delay profile. From this delay profile, the STPU may determine the time duration (or delay) between the time of transmission from the transmitter (e.g., radar module 102A) and the time of reception at the receiver (e.g., radar module 102B). For a plurality of received chirps, each delay profile may provide information regarding the delay (as well as range) to possible targets located in the scene. Although the previous example refers to using a chirp, other types of waveforms including a single pulse may be used to determine delay caused by targets in a scene.

To illustrate further, for stationary radar modules and a scene with one or more stationary targets, the drift of the FFT bins in the delay profiles may be due to the relative clock drift occurring locally at the radar modules, such as drift occurring at the clock circuitry 108A-B. FIG. 6 at 699A shows an example of clock drift. For example, the radar module 102A may experience clock drift as shown at 699A, which may cause other reference signals (e.g., local oscillator reference signals) at radar module 102A to also drift. Likewise, the radar module 102B may experience, for example, a different clock drift as shown at 699A. In this example, the clocks at each of the radar modules 102A-B are not synchronized, so the STPU may compute, based on the determined delay profiles for example, the clock drift between the radar modules.

At 712, the STPU 190 may apply a shift to the delay profiles to compensate for drift, such as the delay determined at 710. For example, a first delay profile for a first chirp and a second delay profile for subsequent second chirp may be correlated to determine the shift in time between the delay profiles. This time shift may be used to shift the delay profiles. To illustrate further, FIG. 7B depicts at 750A a first delay profile corresponding to a first chirp transmitted at radar module 102A but received at radar module 102B. And, FIG. 7B depicts at 750B a second delay profile corresponding to a second chirp transmitted at radar module 102A but received at radar module 102B. The peaks at 760A-B represent the same static target, so any difference in delay may be attributed to clock drift. At 750C, a correlation is performed to determine the difference (or time shift) in delay between the delay profiles at 750A-B. The determined delay difference is applied, at 712, to the second delay profile to yield delay profile 750D.

The delay profile shown contains at FIG. 7B includes contributions from multiple targets in the scene. The clock drift between consecutive pulses may be determined from the delay profile, without requiring selecting a particular calibration target. For example, for a stationary scene and a stationary radar platform, the delay profiles corresponding to consecutive chirps may stay static. If a drift occurs between the delay profiles, the drift may be attributed to the clock drift of the two radar modules. Thus, correlating delay profiles across successive intervals at different candidate time offsets, and picking the time offset that yields the best correlation match, provides an estimate of the clock drift between the intervals, which can be applied as a shift at 712 to synchronize in time the clock circuitry of the radar modules. b Although FIGS. 7 at 710 and 712 refer to computing a delay profile for the pulses and correcting for the delay caused by clock drift, the process may also determine frequency errors and correct for the error as well.

At 714, the STPU 190 may select a stationary calibration target based on a predetermined criteria, in accordance with some embodiments. For example, a scene may include a plurality of candidate targets, some of which may be stationary. The STPU may select one of the stationary targets, such as target 150. The selection of a target may be based on one or more factors. For example, the STPU may select a stationary target that is large or has a good power reflection, such that the corresponding target returns at each of the radar modules 102A-B have sufficient quality and/or signal strength for processing.

At 716, the STPU 190 may estimate variation in the phase of the static calibration target selected at 714, in accordance with some embodiments. Referring to FIG. 7C, a static target may correspond to a target, such as a static target 760A, depicted in the delay profiles 770A-B. As noted, the delay profile at 770A represents the time domain waveform representations of a first chirp transmitted by radar module 102A and received as a return as radar module 102B, and the delay profile at 770B represents the time domain waveform representations of a second chirp transmitted by radar module 102A and received as a return as radar module 102B. For example, a large static target may affect the chirps and cause the peak 760A. At the peak 760A corresponding to the target, each chirp and corresponding delay profile may have a corresponding phase. Over a given period of time (e.g., the time duration between transmitting the first chirp and the second chirp), a phase history representative of the phase changes at a given target may be generated. As noted, the 1D FFT used to generate the delay profile at 770A also provides the phase at 760A for the first chirp, while the 1D FFT used to generate the delay profile at 770B provides the phase at 760A for the second chirp. This variation in phase from chirp to chirp may provide a phase history representative of the variation in phase occurring at the radar modules 102A-B (e.g., local oscillator phase drift as depicted at 699B). This variation may be determined and used to correct at 718 the return data associated with the first and second radar modules.

As noted, the STPU 190 may process the phase history of the selected, stationary target 150 across multiple delay profiles corresponding to multiple, consecutive chirps. Referring to FIG. 7C, the phase history corresponding to the selected target (which in this example is 760A-B which yields the largest amplitude in the range bin in successive delay profiles). For a stationary target and stationary radar modules, the phase should not change across multiple delay profiles for the selected, stationary target 150. If there is a phase change in the estimated phases, the change is due to the relative phase variation of the two oscillators (see, e.g., 699B showing an example of the relative phase drift of the two oscillators).

At 718, the STPU 190 may, in accordance with some embodiments, correct for the variations of the relative phase of the local oscillators at the radar modules 102A-B. And, this correction may be based on the estimated phase difference determined at 716. For example, the STPU 190 may correct for the phase drift by providing to each of the radar modules feedback to change the reference signals associated with for example a local oscillator used by the RF circuitry for transmission and/or reception of radar signals. Alternatively or additionally, the correction may be applied by the STPU as part of so-called post processing. For example, the STPU may directly apply a phase correction to the returns (or the digital data representative of the returns) to synchronize in phase the returns (or the digital data representative of the returns) from the first and second radar modules.

Figure 7A:
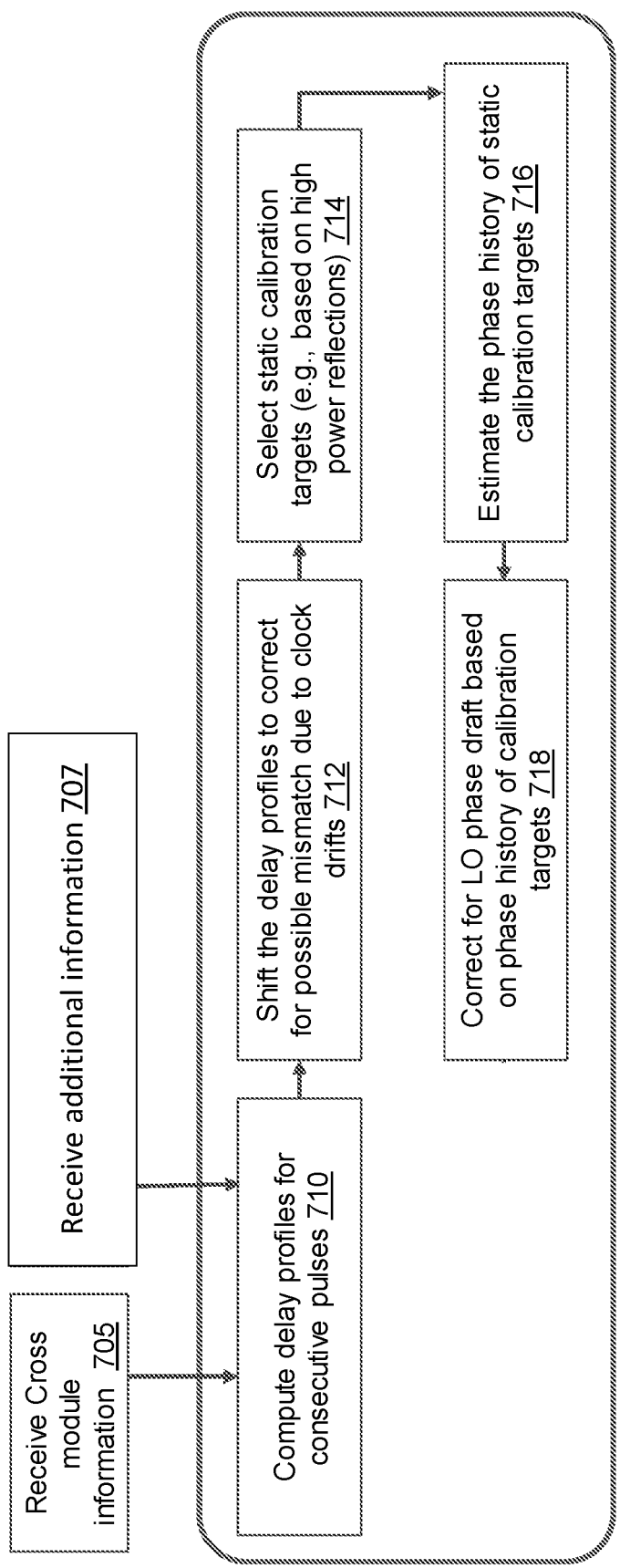
FIG. 7A depicts another example of a process for synchronizing radar modules, in accordance with some embodiments.
Figure 7B:
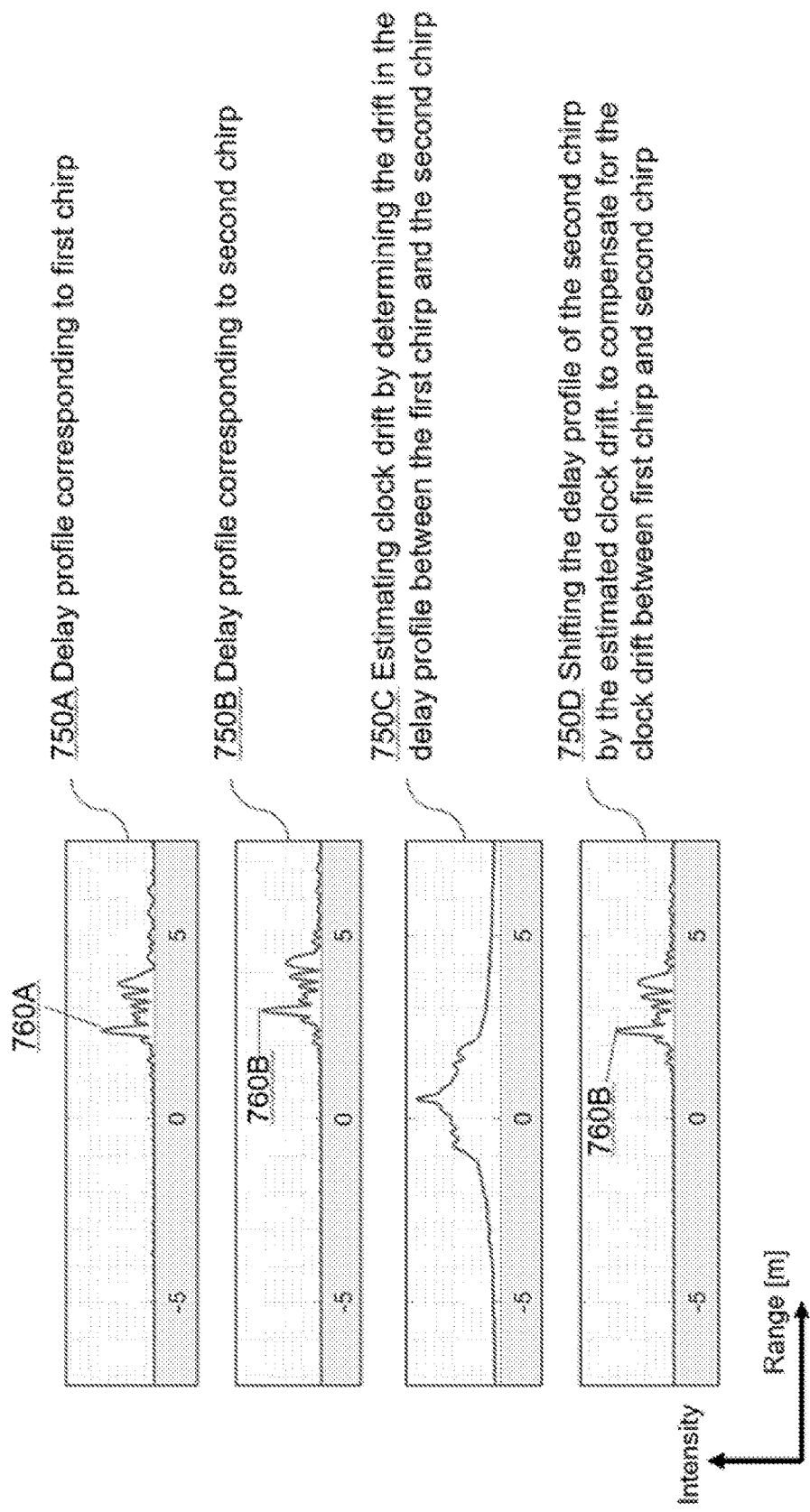
FIGS. 7B depict certain aspects of the process of FIG. 7A.
Figure 7C:
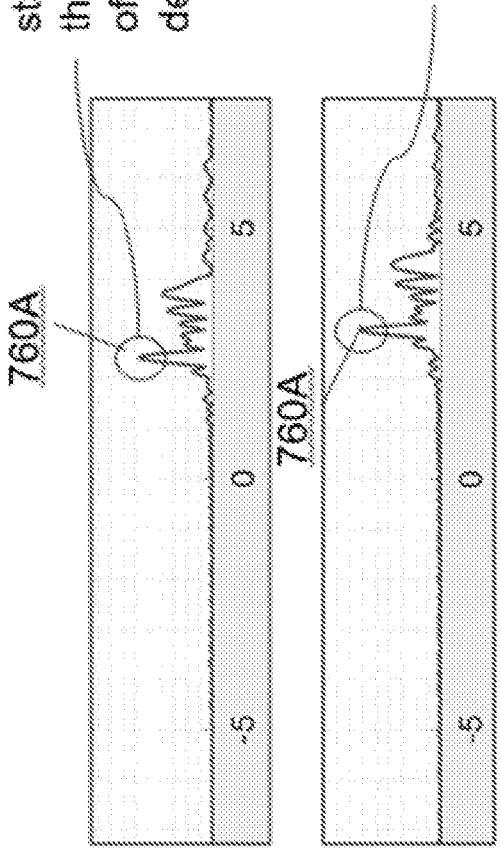
Figure 8:
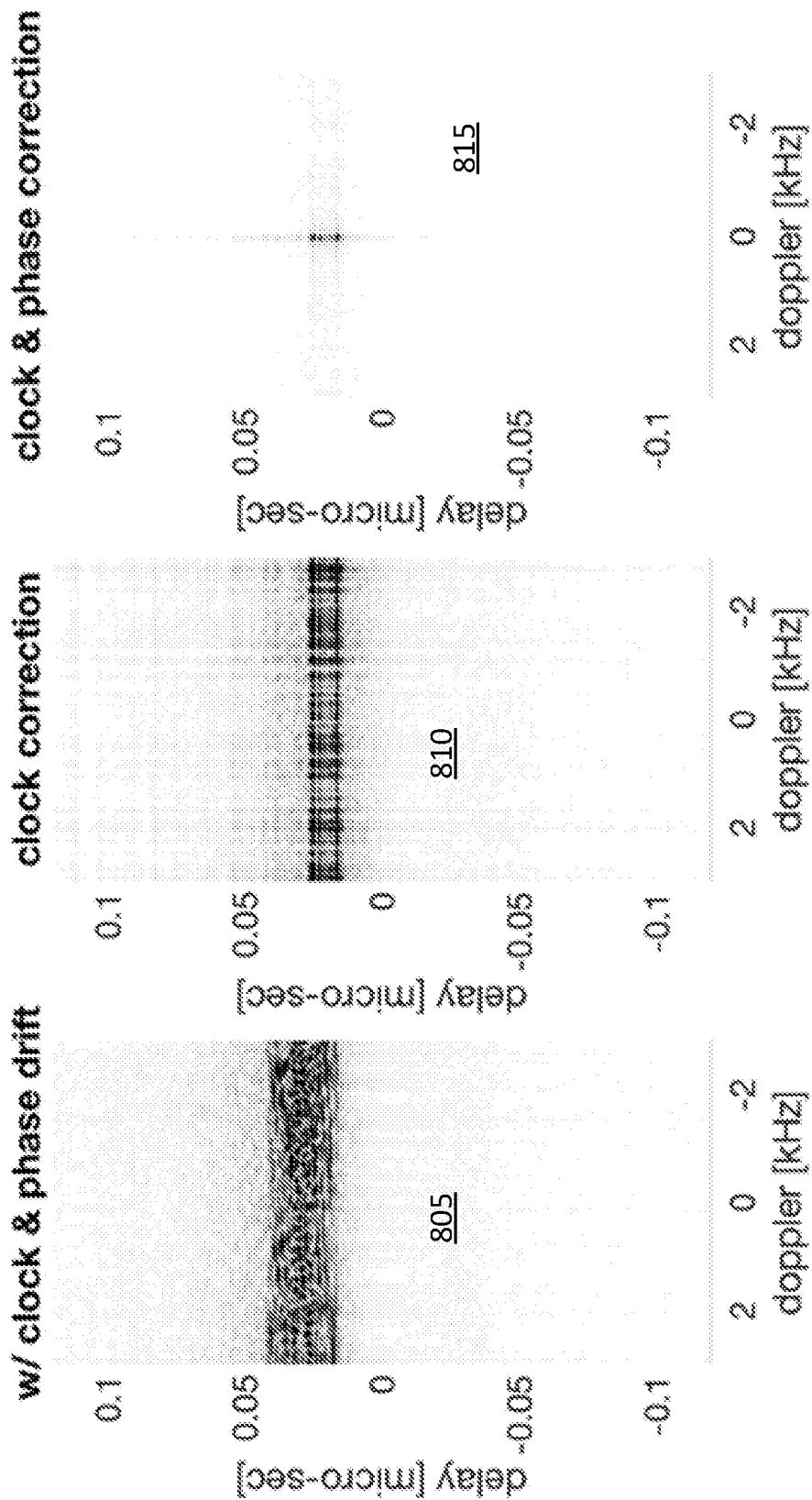
FIG. 8 depicts plots of delay versus Doppler, in accordance with some example embodiments.

FIG. 8 depicts an example of experimental results where the STPU 190 corrects for clock drift at 712, by aligning delay profiles as illustrated in FIG. 7B, and then corrects for phase at 718 by using the phase history of the large stationary target identified in FIG. 7C. The plot 805 depicts delay versus Doppler shift in the case of merely performing 2D FFT processing as shown in FIG. 5. The plot 810 depicts delay versus Doppler shift in the case of after the first stage of timing or frequency correction at 712. And, the plot 815 depicts delay versus Doppler shift in the case of performing the second stage correction at 718 to correct, for example, relative phase drifts in a local oscillator signal, reference signal, and/or clock source. Unlike the plots 805 and 599, the plot at 815 shows the result of the two stage processing. Specifically, zero Doppler is shown at 815, which should be the case as the calibration target selected at 714 is static and local clock phase drift is reduced or eliminated at 718.

The plots shown in FIG. 8 are based on experimental data. The experimental data represents a sequence of chirp waveforms used to capture data from a static scene with the following waveform parameters: the number of chirps transmitted is 64, starting frequency of each chirp is 77 GHz, the slope of each chirp is 30 MHz per micro seconds, the durations of each chirp is 60 micro seconds (the bandwidth of each chirp is about 1.8 GHz, covering between 77 GHz and 78.8 GHz), the sampling rate of the analog to digital converter within each chirp is 10 MHz, the number of samples taken from each chirp is 256.

In some embodiments of the process of FIG. 7A, the STPU 190 may not explicitly select calibration targets at 714, but rather the STPU may use the features of the targets in a scene, such as statistical features of the targets in the scene, to determine the errors in the relative phase between the two radar modules 102A-B. For example, an aggregate statistical parameter, such as the average of the phase history across delay profiles may be used to determine the phase errors in 716. In this embodiment, 712 and 716 may be combined such that statistical metrics are used to subtract out the clock drift and relative phase errors of the oscillators without performing a formal target selection at 714. Moreover, additional information may be used such as the rate of change in the scene and/or statistical properties (e.g., average properties) associated with a number of large targets.

Figure 9:
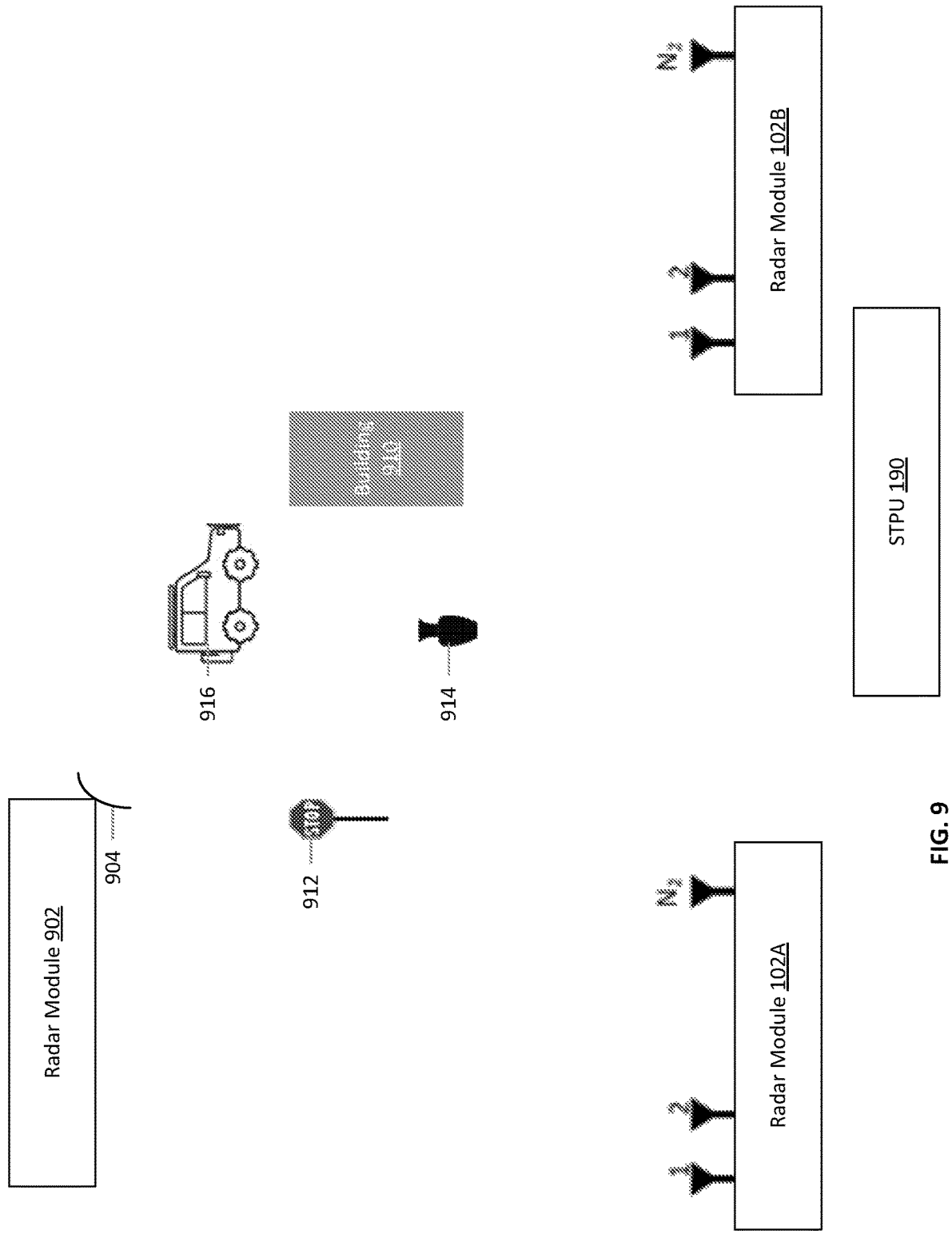
FIG. 9 depicts another example implementation example of the radar modules and the short time processing unit, in accordance with some example embodiments.

FIG. 9 depicts an example of a system including a plurality of radar modules, such as radar modules 102A-B and radar module 902 including antenna 904. The STPU 190 may receive returns from the radar modules 102A-B and 902 via wired and/or wireless links to enable the STPU to perform the synchronization disclosed herein. In the example of FIG. 9, the scene being scanned by the radar modules includes a plurality of objects 910-916. Object 916 may be in a mobile state. Likewise, one or more of the modules may be in a mobile state. For example, radar module 902 may be located on a drone or other type of mobile platform.

Moreover, in the example of FIG. 9, the radar modules may be implemented in the millimeter wave (MMW) band or a portion of the MMW band. For example, the radar modules may be implemented to operate in an unlicensed MMW band such as the 57 GHz to 71 GHz band and thus provide high performance radar and imaging systems. Alternatively or additionally, the frequency of operation of a radar module may span microwave to mm-wave range (3 GHz to 300 GHz). Alternatively or additionally, the frequency of operation of a radar module may span up to THz frequencies for specific applications (e.g., 300 GHz to 3 THz). In some embodiments, the radar modules may operate in the range between 20 GHz to 160 GHz. In some embodiments, the radar modules may operate in the same waveguide band.

Furthermore, the radio modules 102A-B and 902 may, when synchronized, provide a scalable millimeter wave array with large aperture including 104A-N, 106A-N, and 902. And, the radar modules may be spatially separated as noted but still maintain frequency, time, and/or phase synchronization, without requiring the distribution of a high frequency synchronization signal to each of the radar modules.

In some example embodiments, the radar modules may be spatially separated. When this is the case, each radar module may be a distance L from other radar modules. For example, when there are two radar modules in a system, the distance L between the two modules may be greater than or equal to 20 times the operating wavelength. If there are 5 or more radar modules in a system, the pairwise distance L may be greater than or equal to 50 times the operating wavelength. And, in some instances, the distance L may be greater than or equal to 100 times the operating wavelengths for larger baselines. The radar modules may be located on the same moving platform, different mobile platforms, some on a mobile platform, and/or some on a stationary platform.

The radar module may, as noted, include transmitter circuitry and/or receiver circuitry coordinated and timed through common baseband signal, control, and timing signals, and may include envelope locking but not necessarily the carrier phase for full coherency. Each radar module may also include circuitry for up/down frequency conversion block(s), memory unit(s), buffer(s), analog to digital converter(s), local processing unit(s), RF amplifier(s), RF splitter(s)/combiner(s), phase shifter(s) or mixer(s). The circuitry within a given radar module may share a common reference signal, such as the same clock and/or local oscillator. Moreover, a given radar module may transmit and receive coherently. And, the radar module may operate in MIMO configuration.

As noted above, a given radar module may use a local reference signal to enable synchronization of transmission and/or receiver circuitry in time, frequency and phase (e.g., fed by the same carrier signal that is locked to a stable reference, for example a crystal). At any point in time, a transceiver element can be set to be either in transmit mode or receive mode. The antenna elements of a radar module may be uniformly space, although the antenna elements may not necessarily uniformly spaced as well. As noted, the circuitry within a radar module may be fully synchronized in time, frequency, and phase, so each radar module may coherently process the data captured from its own transmit, receive, and/or transceiver elements. Among radar modules however, the STPU 190 may provide synchronization in frequency, time, and/or phase. This synchronization may take the form of the STPU synchronizing the returns (e.g., digital data representative of the returns) in frequency, time, and phase as a post-processing function as noted above. Alternatively or additionally, this synchronization may take the form of the STPU providing feedback to the radar modules to correct for frequency, time, and/or phase.

Furthermore, the spatially separated radar modules may create a large aperture which provides resolution enhancement in azimuth and elevation angles (depending on the geometrical arrangement of the modules). Further, the spatially, separated radar modules may provide the capability of looking at the scene from different vantage points, which may improve the detection capability of the radar system for complex and spatially-extended targets. And, the capability of transmission and reception from different and spatially separated radar modules (and the corresponding cross-module measurements) may significantly improve the overall system sensitivity and performance by improving the signal-to-noise ratio (SNR) of the target responses and improving the Radar Cross Section (RCS) of spatially extended targets (transmission at a certain angle and reception from a different angle).

In some example embodiments, the radar modules may collect specular and/or diffuse reflections from targets at different ranges.

In some example embodiments, the radar modules may be locked (e.g., synchronized) in frequency or time delay, but not phase. When this is the case, the process at FIG. 7A may still be used. For example, at least 716 and 718 may be performed to correct for the phase drift.

In some example implementations, the radar modules may share a common clock, such as a GPS clock reference or a common clock distributed across modules. When this is the case, the process at FIG. 7A may still be used. For example, at least 716 and 718 may be performed to correct for the phase drift. At a given radar module, the local oscillator may be locked through for example phase locked loop circuitry to a low frequency reference, such as a crystal oscillator based reference, such as 116A. Even if the low frequency reference is shared among radar modules, one or more aspect of the process at FIG. 7A may still be used to correct for phase and/or further adapt the errors among the radar modules in frequency or time.

Figure 10:
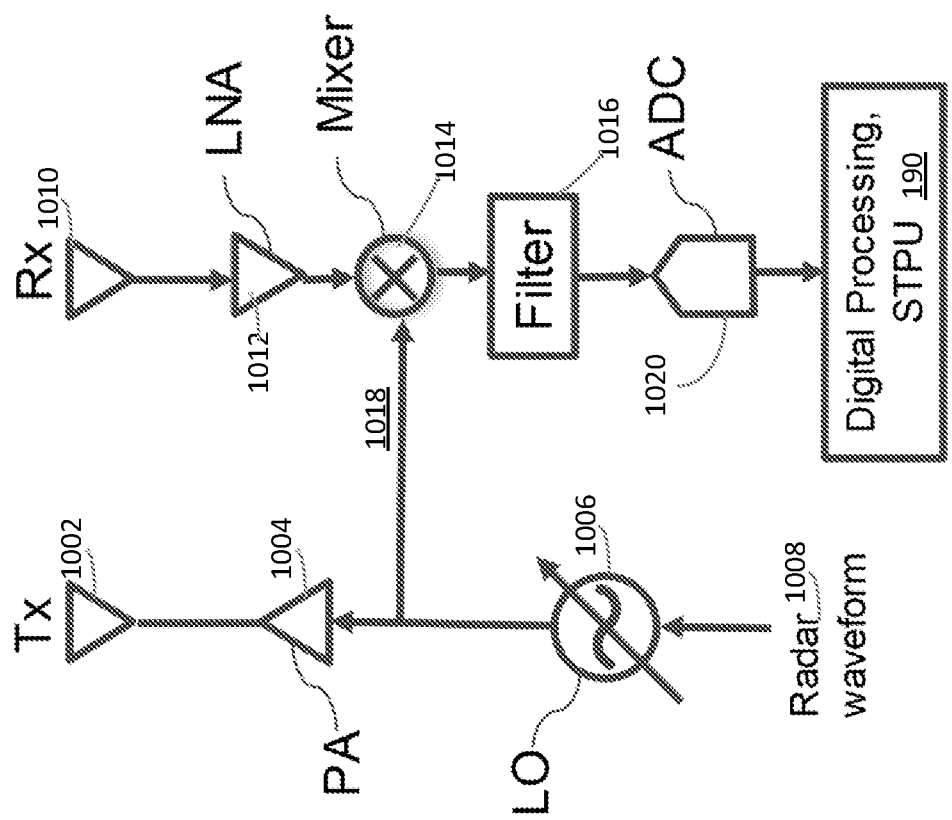
FIG. 10 depicts an example of a radar module, in accordance with some example embodiments.

FIG. 10 depicts an example of a radar module. The radar module may include a receive portion and a transmit portion.

The receive portion may include one or more antennas 1010 coupled to at least one low noise amplifier (LNA) 1012. The output of the LNA 1012 may be coupled to an input of mixer 1014. Mixer 1014 includes a reference signal 1018, which may be used to enable the downconversion provided by mixer 1014. The output of the mixer 1014 may be coupled to a filter 1016, such as a bandpass or lowpass filter. The output of the filter may then undergo analog-to-digital conversion 1020. The output the analog-to-digital converter 1020 may include digital data representative of the radar returns received via the antenna(s) 1010. This digital data may be further processed digitally including processing by the STPU 190.

The transmit portion may receive a radar waveform 1008, which is upconverted using the local oscillator (LO) 1006, and then amplified via power amplifier 1004 for transmission via one or more antennas 1002. The power amplifier 1004 can be turned off, so that the radar module can operate as a receiver-only module. The received signal is received by antenna 1010 and amplified via the low noise amplifier 1012. In the example embodiment shown in FIG. 10, the bandpass signal 1018 from the transmitter is mixed against the received signal at the output of the LNA 1012, using mixer 1014. The radar module may include additional circuitry as well including clock circuitry, etc.

In some implementations, the radar modules transmit and/or receive frequency modulated waveforms with a center frequency in the 20 GHz to 160 GHz range. For example, the waveforms may comprise frequency chirps in form of frequency modulated, continuous wave (FMCW) or stepped-frequency continuous wave signals. In some implementations, the transmission and/or reception of these waveforms may be in one frequency band or multiple frequency bands across the microwave or millimeter wave frequency ranges.

As noted above, the radar modules may be in partial synchronization (e.g., in time, frequency, and/or phase) using phased-locked loops and/or local frequency multipliers by distributing a local oscillator at frequency which may be a fraction of the carrier frequency (e.g., 0.25 times the carrier frequency or less). As noted, the processes disclosed herein may be used to further enhance the synchronization by reducing time, frequency, and/or phase errors between the radar modules.

In some example embodiments, the STPU 190 may, as noted, provide a feedback signal to adjust the frequency, time, and/or phase. For example, the STPU may adjust the frequency, time, and/or phase of the local oscillator 1006, which provides a reference signal for the downconversion provided by the mixer 1014. This adjustment may thus correct for phase drift of the local oscillator signal 1018 as well as other errors associated with frequency or time. The adjustment may also adjust the frequency, time, and/or phase of other components, such as the frequency reference 116A, 117A, and/or the like.

Although FIG. 10 depicts an example of a radar module, the radar module may take other forms. Moreover, the transmit portion and receive portion may be implemented in a duplex configuration, in which case the radar module may switch between transmit and receive configurations while sharing the same antennas.

Although some of the examples refer to adjusting reference signal related errors such as clock drift, local oscillator drift, and/or the like, the system and methods disclosed herein may correct errors generated by other sources. For example, the phase variation in the received return signals may be due to mechanical vibrations of the radar module rather than phase variations of the oscillators, and this phase variation may be determined and corrected as disclosed herein. Moreover, another source of error or drift in phase, frequency, and timing of the signals may be caused by temperature variations, and this phase, frequency, and timing variation may be determined and corrected as disclosed herein. Furthermore, the STPU may, based on the cross module information, determine a mismatch between the waveform generated at the transmitter in radar module 102A and the waveform generated at the receiver in radar module 102B. Given the radar modules are using a chirp waveform for example, the STPU may determine a mismatch between the slopes of the chirps generated at the transmitter and the receiver.

Without in any way limiting the scope, interpretation, or application of the claims appearing below, a technical effect of one or more of the example embodiments disclosed herein may be enhanced frequency, time, and/or phase synchronization.

The system 100 including the frequency, time, and/or phase correction disclosed herein may be used to provide an antenna array comprising spatially separate radar modules (each of which has one or more antenna elements).. The system 100 may be used in mobile or stationary applications. Moreover, the system 100 may be used in air-to-air, air-to-ground, or ground-to-ground application. Furthermore, the system 100 may be used to provide gesture detection (e.g., in mobile, large screens, and/or interactive systems), feedback in augmented reality/virtual reality) applications or entertainment systems.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
receiving, at a processor, cross module information, the cross module information including target profile information obtained from radar returns received at a first radar module and transmitted by a second radar module; and
determining, at the processor, a frequency correction, a time correction, and/or a phase correction to enable correction of errors caused in part by the first radar module and/or the second radar module, the determining based at least on the received cross module information, wherein the determining of the phase correction is based at least on phase variation obtained from at least the target profile information, in-module measurement information, and/or scene information, and wherein the phase variation may be obtained by a phase of a selected target in a scene estimated over a plurality of delay profiles.

2. The method of claim 1, further comprising:
applying the determined frequency correction, the determined time correction, and/or the determined phase correction to correct errors caused in part by the first radar module and/or the second radar module.

3. The method of claim 2, wherein the applying comprises:
providing a feedback signal to the first radar module and/or the second radar module to correct for the determined frequency correction, the determined time correction, and/or the determined phase correction.

4. The method of claim 2, wherein the applying comprises:
adjusting, as part of post-processing by the processor rather than by the first radar module and the second radar module, digital data representative of received returns to correct for the determined frequency correction, the determined time correction, and/or the determined phase correction.

5. The method of claim 1, wherein the received information includes scene information, wherein the scene information includes map data regarding a location of at least one possible target in view of the first radar module and/or the second radar module.

6. The method of claim 5, wherein the received information includes in-module measurement information, wherein the in-module measurement information includes radar returns received at the first radar module and transmitted by the first radar module, wherein the in-module measurement information includes a corresponding target profile for the at least one possible target.

7. The method of claim 6, wherein the determining is further based on the scene information and/or the in-module measurement information.

8. The method of claim 7, wherein the determining of the frequency correction and/or the time correction is based on a difference in frequency and/or time determined from at least the target profile information, the in-module measurement information, and/or the scene information.

9. The method of claim 1, wherein the phase correction corresponds to variations of relative phases of a first local oscillator at the first radar module and a second local oscillator at the second radar module.

10. The method of claim 1, further comprising:
selecting a target to enable the determining of the frequency correction, the time correction, and/or the phase correction, wherein the determining of the frequency correction, the time correction, and/or the phase correction is based on a frequency error, a time error, and/or a phase error determined based on the selected target.

11. The method of claim 1, wherein the first radar module and the second radar module each comprise clock circuitry, a local oscillator, and at least one antenna, and wherein the first radar module and the second radar module each transmit and receive within at least a portion of the millimeter frequency range of 18 GHz to 300 GHz.

12. The method of claim 11, wherein the corresponding clock circuitry and/or the corresponding local oscillator at each of the first radar module and the second radar module are independent without sharing a common reference signal.

13. The method of claim 11, wherein the corresponding clock circuitry and/or the corresponding local oscillator at each of the first radar module and the second radar module are partially synchronized in frequency or time, and wherein the applying further synchronizes in frequency, time, and phase.

14. The method of claim 11, wherein the at least one antenna comprises a 1 dimensional antenna array and/or a two dimensional antenna array.

15. The method of claim 1, wherein the determining further includes determining at least one other type of error, and wherein the applying includes applying a correction for the at least one type of error.

16. A system comprising:
at least one processor; and
at least one memory including program code which when executed causes operations comprising:
receiving cross module information, the cross module information including target profile information obtained from radar returns received at a first radar module and transmitted by a second radar module; and
determining a frequency correction, a time correction, and/or a phase correction to enable correction of errors caused in part by the first radar module and/or the second radar module, the determining based at least on the received cross module information, wherein the determining of the phase correction is based at least on phase variation obtained from at least the target profile information, in-module measurement information, and/or scene information, and wherein the phase variation may be obtained by a phase of a selected target in a scene estimated over a plurality of delay profiles.

17. The system of claim 16 further comprising:
applying the determined frequency correction, the determined time correction, and/or the determined phase correction to correct errors caused in part by the first radar module and/or the second radar module.

18. The system of claim 16, wherein the received information includes scene information, wherein the scene information includes map data regarding a location of at least one possible target in view of the first radar module and/or the second radar module.

19. The system of claim 18, wherein the received information includes in-module measurement information, wherein in-module measurement information includes radar returns received at first radar module and transmitted by a first radar module, the in-module measurements including a corresponding target profile for the at least one possible target.

* * * * *